US005590538A

United States Patent [19]

Hsu et al.

[11] Patent Number: 5,590,538
[45] Date of Patent: Jan. 7, 1997

[54] STACKED MULTISTAGE JOULE-THOMSON CRYOSTAT

[75] Inventors: Ike C. Hsu, Los Altos; Jay H. Ambrose, Los Gatos, both of Calif.

[73] Assignee: Lockheed Missiles and Space Company, Inc., Sunnyvale, Calif.

[21] Appl. No.: 558,875

[22] Filed: Nov. 16, 1995

[51] Int. Cl.[6] ............................................. F25B 19/02
[52] U.S. Cl. ................................. 62/51.2; 62/51.1
[58] Field of Search .......................... 62/51.2, 51.1

[56] References Cited

U.S. PATENT DOCUMENTS

| | | | |
|---|---|---|---|
| 3,942,010 | 3/1976 | Peterson et al. | 250/352 |
| 3,990,265 | 11/1976 | Campbell | 62/514 JT |
| 4,386,505 | 6/1983 | Little | 62/514 R |
| 4,392,362 | 7/1983 | Little | 62/514 R |
| 4,468,935 | 9/1984 | Albagnac | 62/514 JT |
| 4,489,570 | 12/1984 | Little | 62/514 R |
| 4,606,201 | 8/1986 | Longsworth | 62/514 JT |
| 4,611,474 | 9/1986 | Musinski | 62/514 R |
| 4,643,001 | 2/1987 | Longsworth et al. | 62/514 JT |
| 4,647,778 | 3/1987 | Kline et al. | 62/51.2 |
| 4,682,032 | 7/1987 | Barrett | 250/352 |
| 4,781,033 | 11/1988 | Steyert et al. | 62/514 JT |
| 4,819,451 | 4/1989 | Hingst | 62/51.2 |
| 4,825,667 | 5/1989 | Benedict et al. | 62/51.2 |
| 4,993,230 | 2/1991 | Hingst | 62/51.2 |
| 5,077,979 | 1/1992 | Skertic et al. | 62/51.2 |
| 5,111,667 | 5/1992 | Häfner et al. | 62/55.5 |
| 5,150,579 | 9/1992 | Hingst | 62/51.2 |
| 5,382,797 | 1/1995 | Kunimoto et al. | 250/352 |

OTHER PUBLICATIONS

Ambrose, J.H., and Hsu, I.C., "Sensor Cooling by Direct Blowdown of a Coolant", *6th AIAA/ASME Joint Thermophysics and Heat Transfer Conference*, AIAA 94–2078, pp. 1–8.

Hsu, I.C., and Ambrose, J.H., "Rapid Cooling by Direct Expansion of Coolant Through and Orifice", *Journal of Thermophysics and Heat Transfer*, vol. 8, No. 3, Jul.–Sep. 1994, pp. 616–621.

Little, W.A., "Microminiature refrigeration", *Rev. Sci. Instrum.*, 55 (5), May 1984, pp. 661–680.

Longsworth, R.C., "Heat Exchangers for Joule Thomson Cryo–coolers", *Proc. of the First International Conference on Aerospace Heat Exchanger Technology*, Feb. 15–17, 1993, pp. 613–628.

*Primary Examiner*—Ronald C. Capossela
*Attorney, Agent, or Firm*—Henry J. Groth; Terry McHugh

[57] ABSTRACT

A stacked multistage Joule-Thomson (J-T) cryostat is described in which each stage comprises a thermally conducting material plate member with fluid passages formed therein and in which the stages are stacked one above the other but separated from each other by thermally insulating standoff supports. Each successive stage in the stack is cooled to successively lower temperature zones by J-T expansion and liquefaction of different coolant gases. Each stage has a restricting passageway connected to a different high pressure gas coolant supply and forming a throttle valve opening into two-phase (liquid-vapor) coolant reservoir passages. The reservoir passages in all but the coldest stage are in heat exchange relation with the high pressure supply passages of the lower boiling temperature coolant gases. The coldest stage is in heat exchange relation with a cold surface on which a device to be cooled can be mounted. Because the stages are constructed of thermally conductive material, there is substantially no thermal gradient within a given stage, and because the stages are thermally isolated from each other, substantial parasitic loads by the heat exchanger section on the cold reservoir for a given coolant is avoided.

28 Claims, 11 Drawing Sheets

STACKED MULTISTAGE JOULE-THOMSON CRYOSTAT

TECHNICAL FIELD

The present invention relates to cryogenic refrigeration utilizing the cooling effect of Joule-Thomson (isenthalpic) expansion of a high pressure refrigerant gas as it passes through a restricting orifice or "throttling valve" into a lower pressure two-phase (liquid-vapor) reservoir. The invention relates in particular to microminiature Joule-Thomson refrigerators or cryostats of planar plate construction.

BACKGROUND ART

Joule-Thomson refrigeration systems are available today in several basic designs or configurations. One common configuration includes helically finned tubes coiled around a mandrel. One end of the tubing opens through a restricting orifice into a reservoir for containing the liquified coolant in thermal contact with an object to be cooled, such as an infrared detector. Upon evaporating as it cools the object, low-pressure gas coolant flows in a return path along the fins outside of the tubing to precool the high pressure supply gas flowing inside the tubes toward the reservoir. A more compact configuration winds steel tubing around the outside of a body of a porous matrix material. The matrix is typically made up of many layers of fine wire mesh screen. Low-pressure return gas moving through the central matrix precools the high-pressure gas flowing in the tubing toward the restricting orifice. The configuration is thus one of a short round cylinder, about 2 cm long and 1 cm in diameter. Many variations of these configurations have been developed to improve the heat exchange between the supply and return gas and between the reservoir and the object being cooled, as well as to provide a thermostat controlled supply gas flow regulator for conserving the limited supply of coolant. Examples of refrigeration systems employing these compact configurations are described in U.S. Pat. Nos. 3,942,010 to Peterson et al., 4,468,935 to Albagnac, 4,606,201 and 4,643,001 to Longsworth et al., 4,781,033 to Steyert et al., 5,077,979 to Skertic et al., 5,150,579 to Hingst, 5,382,797 to Kunimoto et al., and 5,111,667 to Häfner et al. Several of these systems employ multiple stages in cascade to reach temperatures of 80–120 K. or less.

Microminiature refrigerator systems using a planar construction have been devised by William A. Little. These planar systems are described by W. A. Little in the article "Microminiature refrigeration," in *Review of Scientific Instruments,* vol. 55, no. 5, May 1984, pages 661–680, and in U.S. Pat. Nos. 4,386,505 and 4,392,362. The planar Joule-Thomson refrigerators comprise two or more plates of low thermal conductivity material bonded pressure tight and containing micro-sized gas supply and return passages, such as etched capillary channels at one or more plate interfaces, leading to and from a reservoir or chamber. The heat exchange portion of the refrigerator uses counterflow cooling of the supply gas by the vapor returning from the reservoir, with serpentine microchannels to maximize heat transfer over a short distance. One end of the heat exchange portion is at the ambient temperature, while the other end adjacent to the reservoir is near 80 K. This produces a temperature gradient of about 220 K. over about 5 cm, forcing the use of low thermal conductivity plates to minimize parasitic conduction of heat into the reservoir section. Any heat transfer from the higher temperature inlet end across the plate to the cold reservoir end will limit the refrigeration capacity of the device. Thus, most of the units currently under production by MMR Technology (founded by William Little) are fabricated using glass to provide the needed thermal isolation. Even lower thermal conductivity material is required if the overall size of the device is to be reduced further. Little also discloses several multistage embodiments formed into a stack that employs cascade cooling of one stage by another. In these multilayer devices, the low pressure first gas in one layer is in heat exchange relation with the high pressure second gas in another layer. However, even in these multistage designs, the temperature resistance within layers must remain high. While the use of low thermal conductivity material succeeds in thermally isolating the cold reservoir section in each stage from the warmer heat exchange section of that same stage, it has a disadvantage of also reducing the heat transfer needed to precool the incoming gas with the cold exhaust gas, thus necessitating a larger heat exchanger section. Further, the thermal resistance for heat conduction through the plate material from the gas supply passages to the gas return passages can be significant compared to the convection heat transfer between the gas and the passage walls, making it difficult to optimize the heat exchanger design.

An object of the present invention is to provide a planar-type Joule-Thomson cryostat with rapid cooling capabilities while minimizing both parasitic thermal loads and cryostat volume.

DISCLOSURE OF THE INVENTION

The object is met by thermally isolating the heat exchanger section for the primary coolant from its expansion or reservoir section in separate stages that are stacked one above the other but separated by thermally insulating stand-off supports. The reservoir stage for a secondary coolant is integrated with the heat exchange stage for the primary coolant, thus providing different temperature zones between stages, but little if any temperature gradient within a given stage. Each stage can thus be formed of a thermally conductive material without introducing substantial parasitic heat loads. This permits the heat exchanger stage to be optimized for a smaller overall size. The added cooling capacity provided by the secondary coolant reduces the required mass flow rate and pressure drop of the primary coolant, while speeding up the cryostat's cooldown time.

BEST MODE FOR CARRYING OUT THE INVENTION

Figure 1:
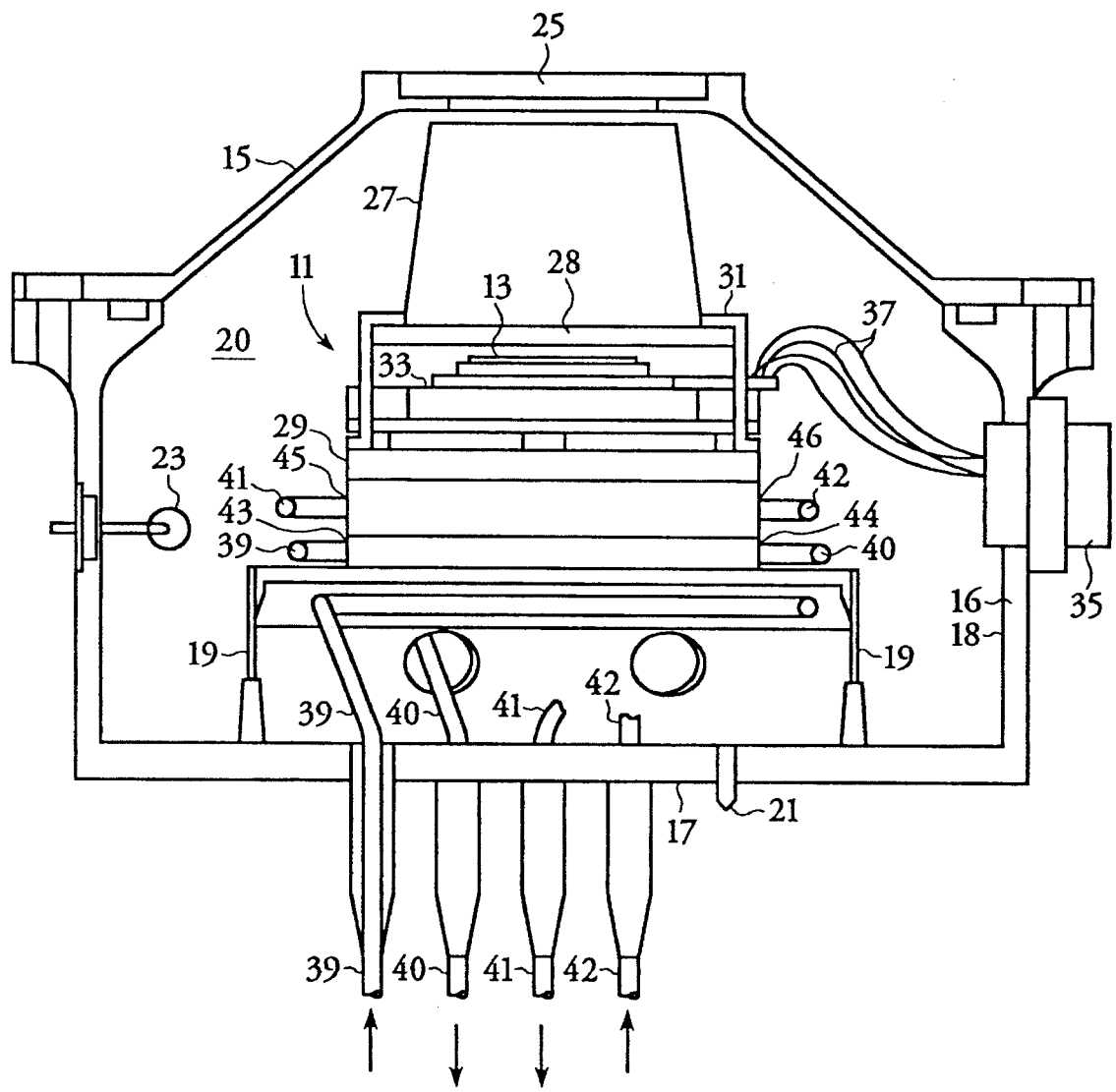
FIG. 1 is a cutaway side view of a cryostat-detector array assembly within a thermal isolation enclosure or vacuum dewar, using a Joule-Thomson cryostat of the present invention.
Figure 2:
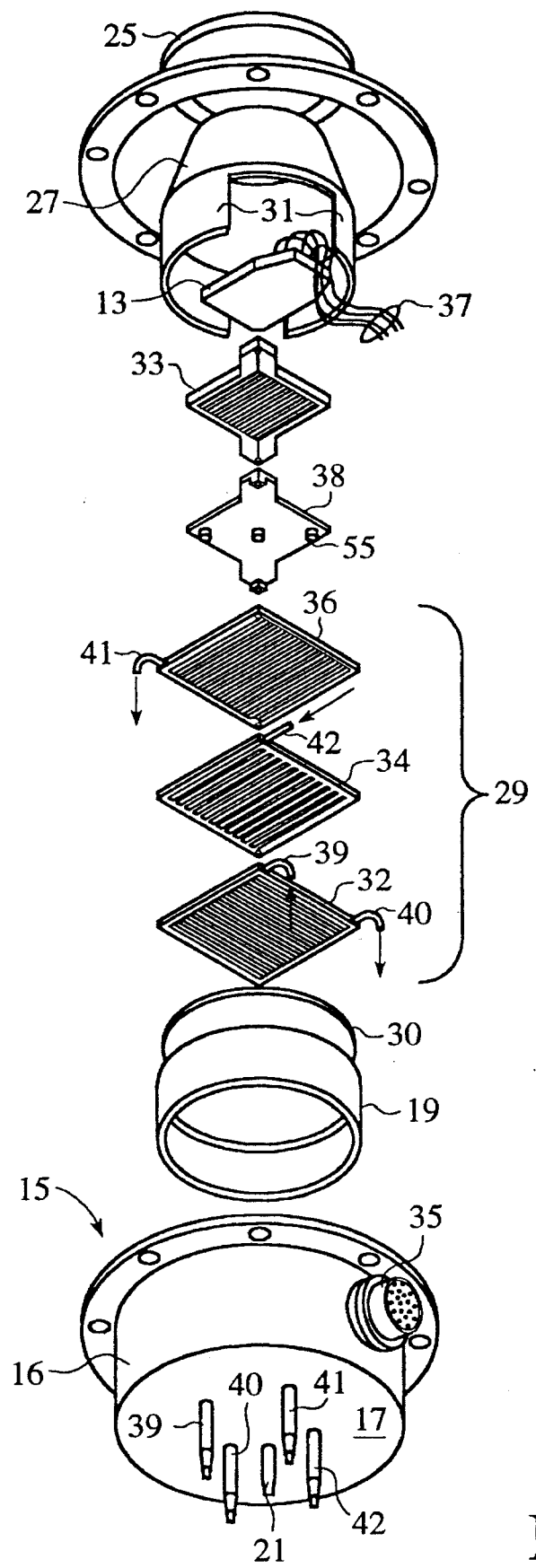
FIG. 2 is an exploded view of the assembly and dewar of FIG. 1.

With reference to FIGS. 1 and 2, a Joule-Thomson (J-T) cryostat 11 of the present invention may be used to cool an infrared detector array 13 located at the focal plane of a larger optical imaging system, such as an infrared camera or telescope system or a guided heat seeking missile. Medium wavelength infrared (MWIR) detectors for sensing in the 3 to 5 micrometer wavelength range, such as HgCdTe or InSb detector arrays operate best with maximum signal-to-noise ratio when their temperature is reduced to about 80–120 K. with a temperature stability during operation of at most ±0.5 K./sec and preferably not more than ±0.2 K./sec. Long-wave infrared detectors for sensing in the 5 to 14 micrometer wavelength range generally require even colder temperatures of about 20–40 K. with comparable stabilities. Other applications for the cryostat 11 of the present invention may include cooling semiconductor electronics made from narrow bandgap (most II–VI and Pb–salt) materials, as well as superconducting devices, such as SQUIDs. In many applications it is desirable to reach the operating temperature as quickly as possible, preferably in less than 30 seconds, then maintain that temperature during a short operating period of at most a few minutes. The device being cooled may be required to operate intermittently over such short time periods or even one time only.

The cryostat and detector array assembly 11 and 13 shown in FIGS. 1 and 2 is enclosed in a hermetically sealed and evacuated housing 15. The housing 15 is a simple single-wall vacuum vessel, as shown, to provide maximum thermal insulation from the ambient environment. The housing walls 16 can be constructed of stainless steel material, selected both for its structural strength to withstand the pressure exerted by the outside environment and for its low thermal conductivity. The wall surfaces 18 should also be polished or coated with gold for low emissivity to minimize heat transfer by radiation. Typical housing dimensions are about 6 cm diameter for the base 17 and a height of about 4 cm. The cryostat 11 is physically mounted to the housing's base 17, while remaining thermally isolated from that base, by means of fiberglass or other low thermal conduction support posts 19.

The interior 20 of housing 15 holding the cryostat and detector array assembly 11 and 13 is evacuated through a pinch-off tube 21 to remove the air, most of whose components would otherwise condense under the cryogenic conditions. A getter 23 may be used to eliminate any residual gases left after evacuation. A very high vacuum is desired to minimize convection between the housing walls' inner surface 18 and the cryostat and detector array assembly 11 and 13. An interior pressure on the order of $10^{-8}$ to $10^{-4}$ torr is typical. Once a vacuum has been established, the evacuation tube 21 is pinched-off to seal the interior without refilling with an inert gas.

The front end of the housing 15 has an infrared transparent window 25 to transmit the infrared image to the detector array 13 at the focal plane of the imaging system. The window 25 may be planar, as shown here, with exterior optics imaging the infrared light onto the detector 13, or alternatively, may be shaped to act as a lens for the infrared light being transmitted. The window 25 can be composed of silicon or some other infrared transparent material capable of withstanding the pressure difference between the exterior and interior of the housing 15. The window 25 typically transmits wavelengths of from 1.2 to 10 μm. Window dimensions, typically about 2.5 cm square or diameter, are chosen to allow the infrared radiation intended to be imaged on the detector array 13 to pass through the window 25, while blocking most stray radiation. A copper cold shield 27 coated with a low emissivity material on the outside but black on the inside surface and maintained at a temperature intermediate between that of the operating temperature of the detector 13 and the outside ambient temperature prevents radiation other than that transmitted through the window 25 from reaching the detector array 13. For a detector operating temperature of about 80–100 K., the cold shield 27 is typically maintained at about 200 K. The cold shield 27 may be mounted to the heat exchanger stage 29 of the cryostat 11 by means of thermally conductive brackets 31 or side wall extensions of the cold shield itself. As discussed below, this heat exchanger stage 29 has a temperature during operation of about 190–210 K., while the cold reservoir stage 33 to which the detector array 13 is mounted has an operational temperature of about 80–100 K.

A spectral filter 28 is positioned above the focal plane to pass only a selected narrow wavelength band to the detector array 13. The spectral filter 28 can be a thin silicon plate with an antireflection (AR) spectral coating designed to transmit only that portion of the infrared spectrum nearest the peak sensitivity of the detector array 13. For example, for a HgCdTe detector with maximum response to 4.1 μm wavelength light, the spectral filter 28 might be tailored to transmit only in a 3.9 to 4.3 μm wavelength range.

An electrical connector 35 is provided in the housing 15 with conductive wires 37 leading from the port 35 to the detector array 13, allowing the detector array 13 to be supplied with electrical power for operation and allowing detection signals from the detector array 13 to be read out through the port 35 to signal processing circuits located exterior of the housing 15.

Gas supply and exhaust tubes 39–42 also feed through the base 17 of the housing 15 in a hermetically sealed manner to provide the coolant gases to the cryostat 11. The tubes 39–42 may be stainless steel hypodermic tubing connected to respective inlet and outlet orifices 43–46 in the heat exchanger stage 29 of the cryostat. Outside of the housing 15, the gas supply tubes 39 and 42 are connected to supplies of high pressure, primary and second coolant gases, such as bottles of compressed gas. As is well known in the cryogenic art, the purity of the gas supply can be improved to prevent clogging of the cryostat 11 by passing the primary coolant gas through a zeolite drier and molecular sieve trap to remove water vapor, then through a particulate filter, before entering the inlet tube 42. If neon is to be used as a coolant, the supplied neon gas may be passed through a charcoal trap to remove condensible nitrogen and oxygen. The exhaust tubes 40 and 41 are usually vented to the outside environment. However, closed-cycle refrigeration, using compressors between respective pairs of inlet and outlet tubes 39 and 40, and 41 and 42, is also possible.

Figure 3:
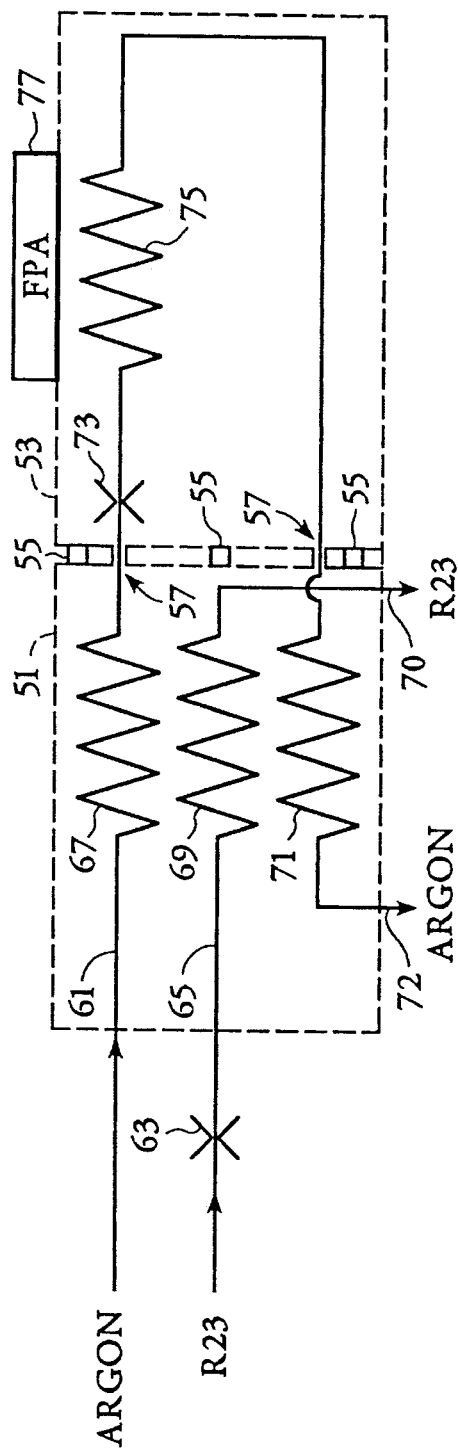
FIG. 3 is a refrigeration flow schematic for a two-stage Joule-Thomson cryostat in accord with the present invention.
Figure 4:
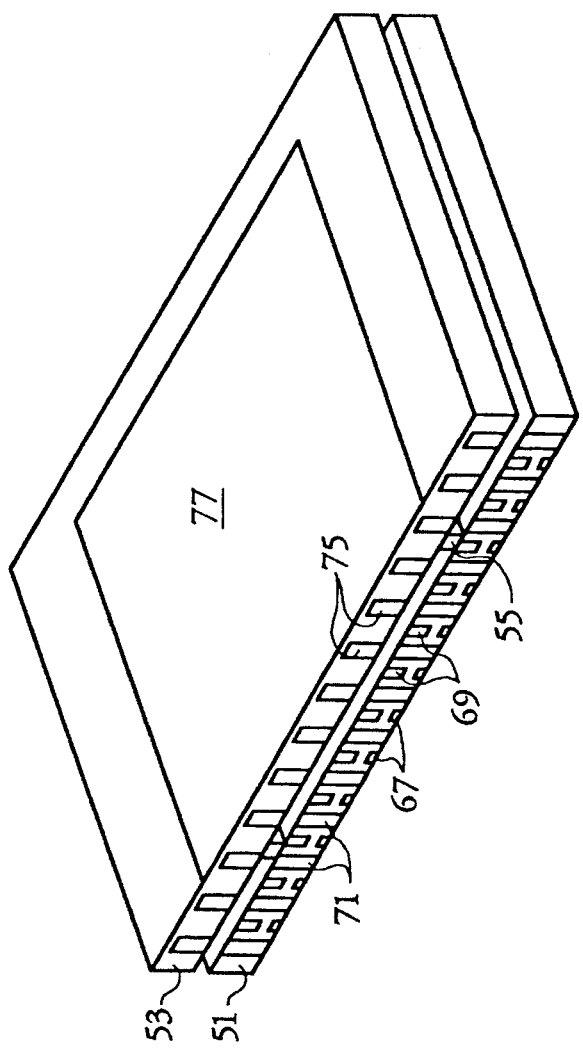
FIG. 4 is a cutaway perspective view of a simplified two-stage cryostat illustrating the basic principle of interstage thermal isolation between the separate heat exchanger and reservoir stages in the present invention, and with the cutaway portion revealing various representative gas flow passages in each stage.

Referring now to FIGS. 3 and 4, the cryostat of the present invention has multiple stages, each operating at its own spatially uniform temperature, which are thermally isolated from each other to maintain separate temperature zones while avoiding thermal gradients. In this first embodiment of the invention, two stages are used, namely a "warm" heat exchanger stage 51 and a "cold" expansion or reservoir stage 53. As seen in FIG. 4, these two stages 51 and 53 are stacked one over the other and separated by thermally insulative standoff supports 55. These supports 55 can be thin wall, fiberglass or composite material, frustrum-type support tubes. Fluid connections between the two stages 51 and 53 can be made through bores 57 formed in insulative material standoffs that are located between the two stages. Because the stages 51 and 53 are thermally isolated, they may be made primarily of thermally conductive material, such as silicon, to reduce thermal gradients over their respective areas.

Joule-Thomson (J-T) refrigeration occurs by means of isenthalpic expansion of a high pressure gas passing through a restricting orifice or "throttle valve" into a lower pressure two-phase (liquid-vapor) reservoir. The temperature change is proportional to the change in pressure, and provided the gas is below its inversion temperature, the reduction in pressure as the gas expands results in a concomitant reduction in temperature. A significant fraction of the gas condenses into a liquid as it cools below the boiling point. By placing an object in thermal contact with the two-phase reservoir, the object can be cooled. The liquid coolant in the reservoir evaporates as it draws heat away from the object being cooled. By continuously replenishing the evaporated liquid and exhausting the vapor (both the uncondensed and evaporated fractions) to maintain a constant vapor pressure over the liquid in the reservoir, the temperature will remain substantially constant over time.

The minimum temperature achieved depends on the pressure of the ambient environment at the exit of the reservoir, and, if desired, one could use a venturi-type vacuum pump at the gas outflow to lower the exhaust pressure to obtain any temperature corresponding to the ambient pressure down to the triple point temperature. For argon gas, the normal boiling point at 1 atmosphere (100 kPa) pressure is 87.3 K., while its triple point temperature is 83.8 K. For nitrogen gas, the normal boiling point is 77.4 K., while its triple point temperature is 63.2 K. For neon gas, its normal boiling point is 27.1 K., while its triple point temperature is 19.0 K. For equilibrium hydrogen, its normal boiling point is 20.4 K., while its triple point temperature is 14.0 K. Other gases could also be used as the primary coolant. The present invention also makes use of a secondary coolant gas whose boiling temperature at ambient pressure is less than the isenthalpic inversion temperature of the primary coolant gas. Also, the secondary coolant's own inversion temperature must be higher than the ambient temperature. Typical secondary coolants are $CHF_3$ (refrigerant R23) with a normal boiling point of 191.1 K., ethane with a normal boiling point of 184.6 K., $CF_4$ (refrigerant R14) with a normal boiling point of 145.2 K., and krypton with a normal boiling point of 119.8 K. Ammonia ($NH_3$), with a normal boiling point of 239.8 K. and a triple point temperature of about 195 K., could also be used as a coolant. For example, it could be used as a primary coolant for operating high-flux VLSI circuits more reliably (and faster) at temperatures of 200–300 K., rather than the usual 350–400 K. temperature range.

Referring to a representative embodiment illustrated in FIG. 4, the first stage 51 forms a heat exchanger stage for precooling the high pressure primary coolant gas supply 61, represented here by argon, to below its inversion temperature. To accomplish this precooling, a high pressure supply of secondary coolant gas, represented here by refrigerant R23, is isenthalpically expanded through a throttle valve 63 formed in the first stage into a low pressure liquid reservoir 65. This lowers the temperature of the first stage 51 to about 190–200 K. That is, the object to be cooled by the liquified, secondary coolant is the first stage 51 itself along with the high pressure primary coolant gas passing through the first stage 51. The secondary coolant reservoir 65 is in heat exchanging relationship with the primary coolant supply channel 61, as represented in FIG. 2 by the adjacent serpentine or parallel flow paths 67 and 69. The secondary coolant vapor is then exhausted into the ambient environment through an outlet port 71. Precooling of the primary coolant gas supply is also assisted by primary coolant exhaust returning from the second stage 53. Typically, this returning primary coolant has its own separate channels 71 in heat exchange relation with the incoming high-pressure primary coolant channels 67. The primary coolant is then vented through an outlet port 72. Alternatively, the low-pressure primary coolant vapor may be mixed with the two-phase secondary coolant in the first stage reservoir 65 and heat exchange passageways 69.

As seen in FIG. 4, the first stage 51 may comprise a thin flat plate of thermally conductive material, such as a silicon wafer, with channels or grooves formed by etching in at least one, and possibly both, of its major surfaces. Cover plates of the same material may be bonded in pressure-tight sealed contact with the etched major surfaces. In the drawing, front portions of the stages have been removed so that the channels can be seen in cross-section. The primary coolant channels 67 typically have a width in the order of 0.1 mm and a depth of about 1.9 mm in the heat exchange passages and are generally not further than about 3.8 mm away from adjacent secondary coolant reservoir and primary coolant return passages 69, both sets of channels generally following a serpentine path or branching into many parallel paths to maximize the heat exchange surface area. The throttle valve 63 for the secondary coolant consists of a tiny orifice of about 0.3 mm diameter located external to the silicon wafer in the plumbing line 39. The restricting orifice opens into a manifold feeding a set of parallel channels 69 of larger depth (up to about 1.4 mm) which serve as the heat exchange reservoir uniformly cooling the first stage.

The second stage 53 includes a capillary tube serving as the throttling valve 73 for the high-pressure primary coolant gas received from the first stage 51. As with the first stage throttling valve 63 for the secondary coolant, this second throttling valve 73 also comprises a channel of small cross-section by means of steadily decreasing etch depth or narrowing width which then opens into a series of parallel channels 75 forming a two-phase reservoir for the primary coolant. The reservoir channels 75 are in heat exchange relation with a focal plane infrared detector array 77, or other electronic device to be cooled, mounted on the cold surface of the second stage. The high conductivity silicon wafer material, in which the second stage channels 75 are formed, maintains a substantially uniform temperature across the entire area of the second stage 53. A greater percentage of that area can then be used to cool the focal plane array 77 ultimately contacting the second stage 53.

Figure 5:
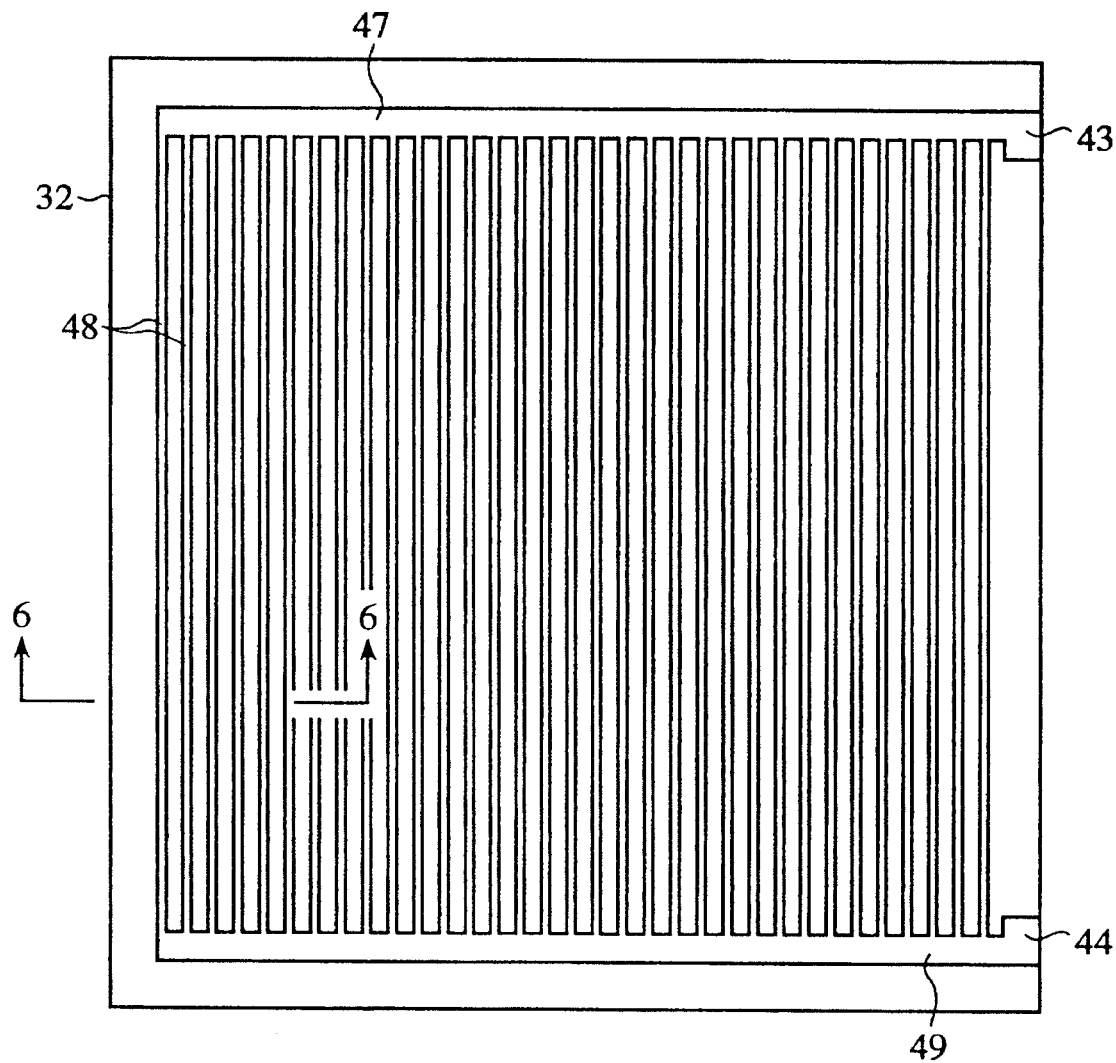
FIGS. 5, 7 and 9 are top plan views of three thin, planar, wafer substrates with channels formed in a surface of each substrate, which when bonded together in stacked relation form a heat exchanger stage for the two-stage cryostat shown in FIGS. 1–3.
Figure 6:
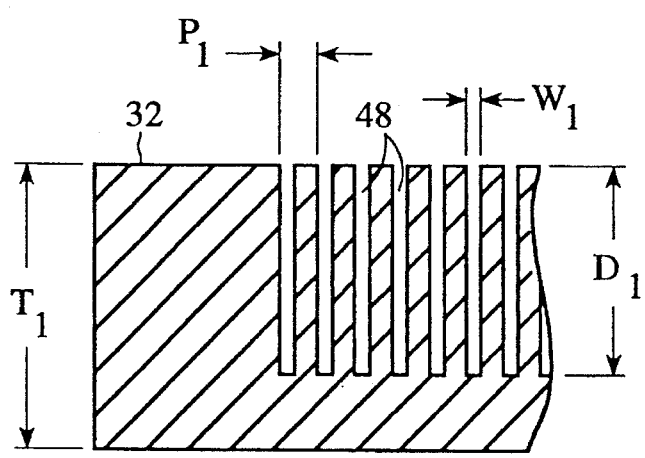
FIGS. 6, 8 and 10 are sectional views taken along the lines 6—6, 8—8 and 10—10 in FIGS. 5, 7 and 9 respectively, illustrating the channels for the secondary coolant, high pressure primary coolant supply and low pressure primary coolant exhaust, respectively.

In FIGS. 5 and 6, a wafer substrate 32, forming part of the heat exchanger stage 29 in FIGS. 1 and 2, has a set of channels 48 formed in one of its two major surfaces. Channels 48 serve as flow passages for liquified secondary coolant. Typically, the substrate 32 is a thin, generally planar, monocrystalline silicon wafer material about 1.8 to 2.0 mm thick (dimension $T_1$ in FIG. 6) and about 2.5 cm square. Silicon is chosen because of its high thermal conductivity and because the channels 48 can be etched into the surface using well established techniques. Other thermally conductive plate materials could also be used. The channels 48, typically about 80 to 100 in number, are arranged parallel to each other at a periodic spacing or pitch ($P_1$) of about 250 μm. Typically, each channel 48 is about 100 μm wide ($W_1$) (and thus separated from adjacent channels by about 150 μm) and about 1.2 to 1.6 mm deep ($D_1$). The parallel channels 48 are connected at their ends to a pair of inlet and outlet channels 47 and 49, each about 0.75 mm wide and approximately the same depth as the channels 48. The inlet and outlet channels 47 and 49 serve as manifolds to distribute the liquified secondary coolant to and collect the vaporized secondary coolant exhaust gas from the parallel channels 48. The inlet and outlet channels 47 and 49 can be either etched or scribed into the substrate surface. At one end of the inlet channel 47 is an inlet orifice 43 allowing a 1.25 mm diameter secondary coolant gas supply tube (tube 39 in FIGS. 1 and 2) to be coupled to the channel 47. Likewise, at one end of the outlet channel 49 is an outlet orifice 44 allowing a 1.25 mm diameter secondary coolant exhaust tube (tube 40 in FIGS. 1 and 2) to be coupled to the channel 49. The inlet orifice 43 or its corresponding supply tube may have a small disc therein with an 0.3 mm orifice through which the high pressure secondary coolant gas supply is constricted to flow before entering the inlet channel 47. Such a disc or some other flow restricting device forms the J-T throttle valve for the secondary coolant. The coolant in the parallel channels 48 are at or slightly above the ambient pressure of the outside environment.

Figure 7:
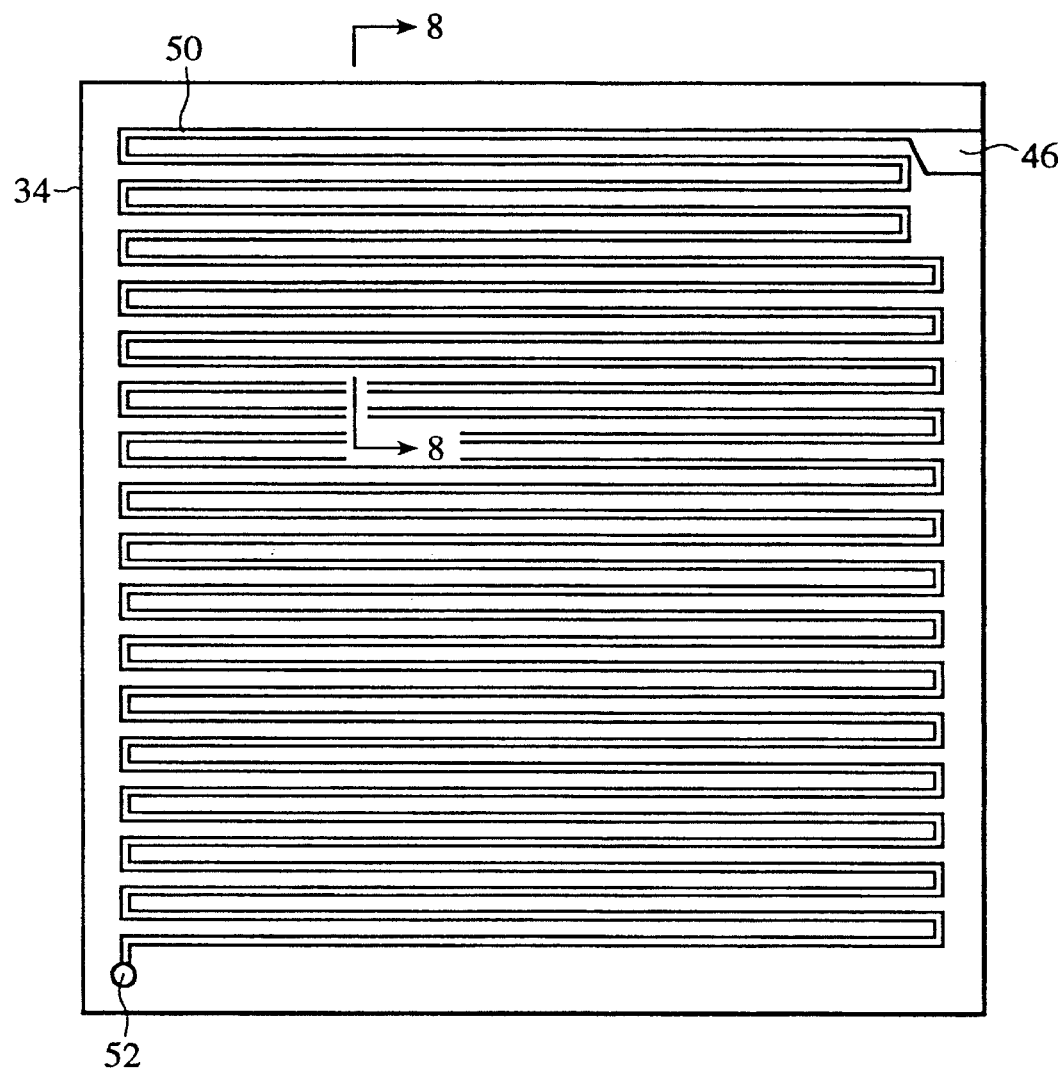
Figure 8:
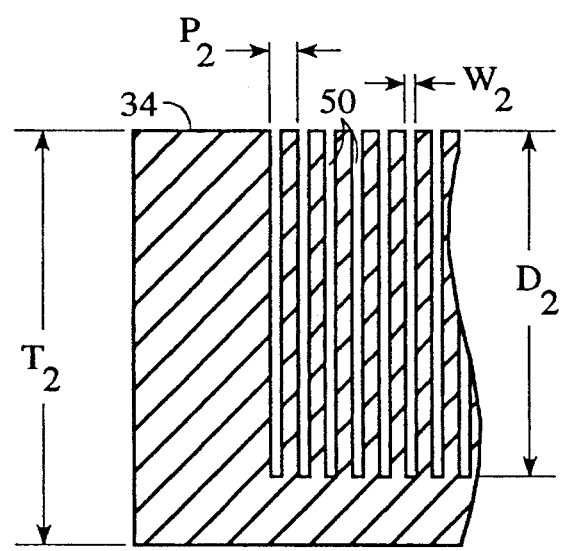

FIGS. 7 and 8 show a second wafer substrate 34 that forms part of the heat exchanger stage 29 in FIGS. 1 and 2. Substrate 34 has a serpentine channel 50 formed in one of its two major surfaces and serving as a high pressure flow channel for the primary coolant gas which is to be supplied to the reservoir stage (33 in FIGS. 1 and 2). Typically, the substrate 34 is made of the same generally planar, monocrystalline silicon wafer material of high thermal conductivity as the substrate 32, but is about 3.6 to 4.0 mm thick (dimension $T_2$ in FIG. 8). Like substrate 32, the substrate 34 is about 2.5 cm square. The serpentine channel 50 is etched into the substrate surface to a depth ($D_2$) of about 3.2 mm and has a width ($W_2$) of about 100 μm. There are about 80 to 100 meanders of the channel 50 spread over the surface area with adjacent meanders occurring at a regular spacing or pitch ($P_2$) of about 250 μm. An inlet end 46 of the channel 50 allows a 1.25 mm diameter, high pressure primary coolant gas supply tube (tube 42 in FIGS. 1 and 2) to be coupled thereto. The opposite end of the serpentine channel 50 from the input orifice is connected to a hole 52 formed through the substrate 34, which, when combined with matching holes 57–59 in other layers described below, forms a passageway for the high pressure primary coolant gas leading to the expansion stage. The hole 52 has a diameter of about 640 μm so that the cross-sectional area of the hole 52 substantially equals the cross-sectional area of the serpentine channel 50.

Figure 9:
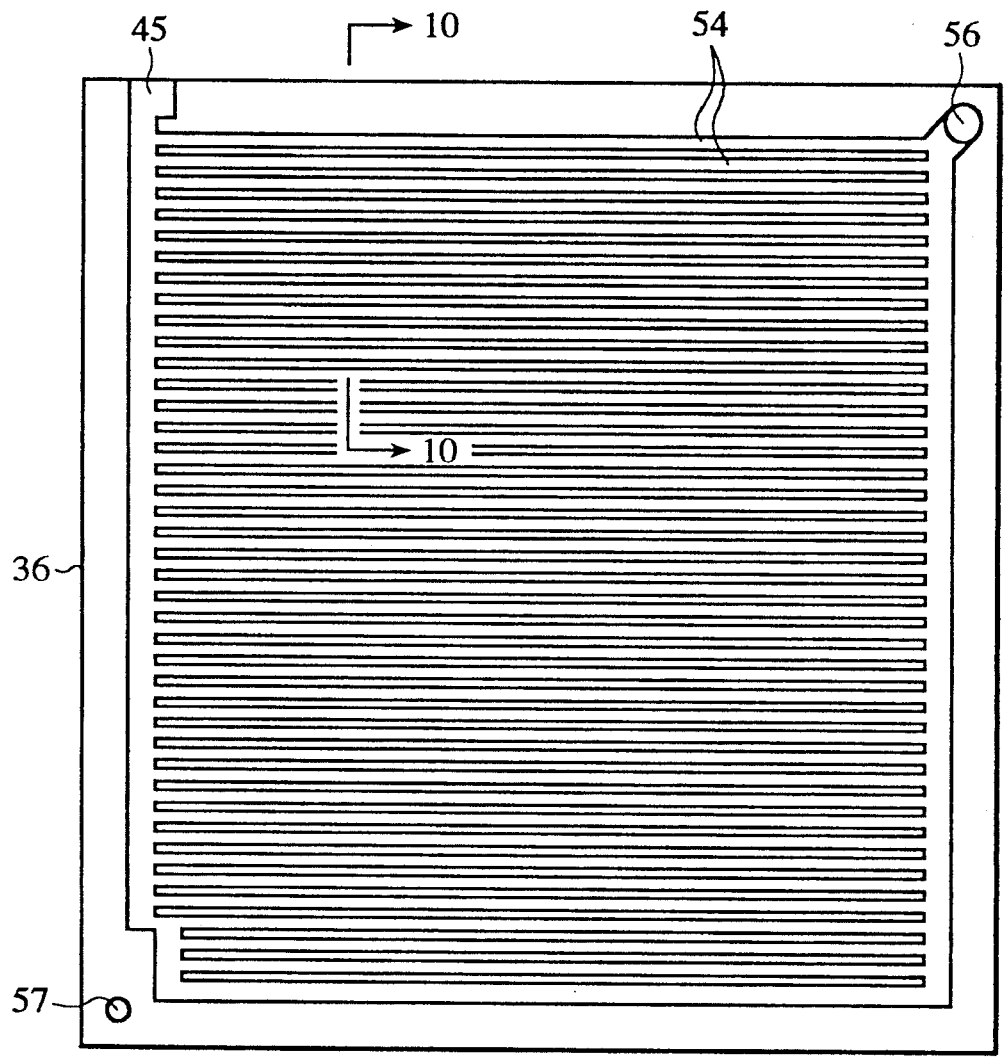
Figure 10:
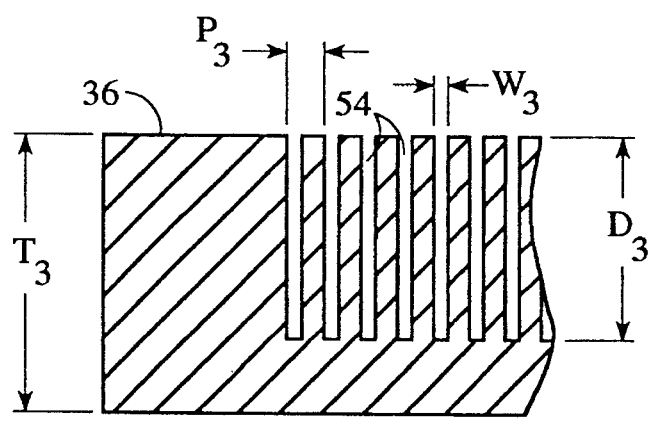
Figure 13:
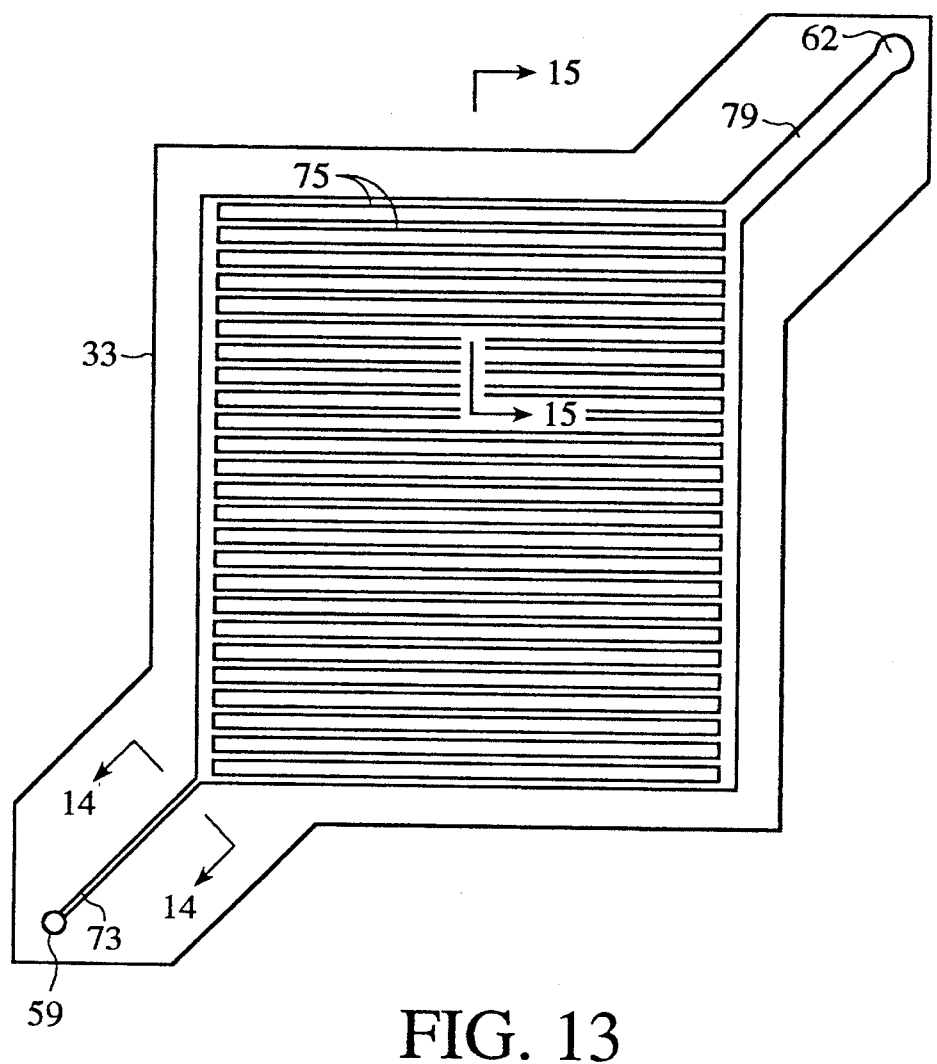
FIG. 13 is a top plan view of a thin, planar, wafer substrate with channels formed in a surface thereof, which when bonded together with the cover plate of FIG. 11 forms a reservoir stage for the two-stage cryostat shown in FIGS. 1–3.

In FIGS. 9 and 10, yet another wafer substrate 36 forms part of the heat exchanger stage along with the previous described substrates 32 and 34. Substrate 36 has a set of parallel channels 54 which serve as flow passages for the low pressure primary coolant return gas. The cold return gas helps the secondary coolant in passages 48 (in substrate 32 of FIGS. 5 and 6) to precool the primary coolant supply gas flowing in the serpentine passage 50 in the adjacent substrate 34 (seen in FIGS. 7 and 8). The return gas is received by the channels 54 through a hole 56 of about 1.0 mm diameter formed through the substrate 36. The hole 56, when combined with matching holes 60 and 62 in adjacent layers described below, forms a passageway for the low pressure primary coolant gas leading from the reservoir stage (FIG. 13). The return gas is exhausted through an exhaust port or outlet orifice 45 that allows a 1.25 mm diameter tube (41 in FIGS. 1 and 2) to be coupled thereto. The channels 54 typically have a depth ($D_3$) of about 1.2 to 1.4 mm etched into a surface of a 1.8 to 2.0 mm thick ($T_3$) flat wafer substrate of high thermal conductivity material, such as monocrystalline silicon. The channels 54 further have a typical width ($W_3$) of about 100 μm and a regular spacing or pitch ($P_3$) of about 250 μm. In one corner of the substrate 36, a hole 57 of about 640 μm diameter is aligned with the corresponding hole 52 in the substrate 34 of FIG. 7.

Figure 11:
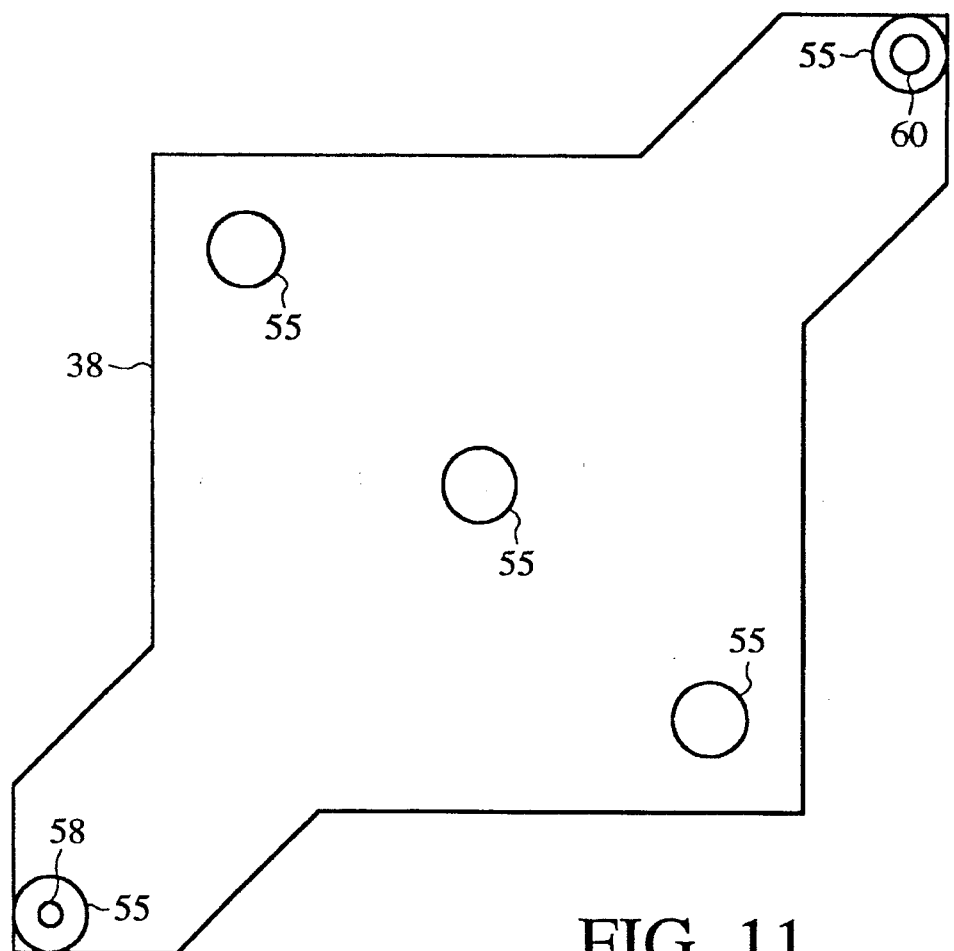
FIG. 11 is a top plan view of a cover plate for the reservoir stage of the two-stage cryostat shown in FIGS. 1–3 with thermally insulating standoff supports or spacers providing thermal isolation between the heat exchanger and reservoir stages.
Figure 12:
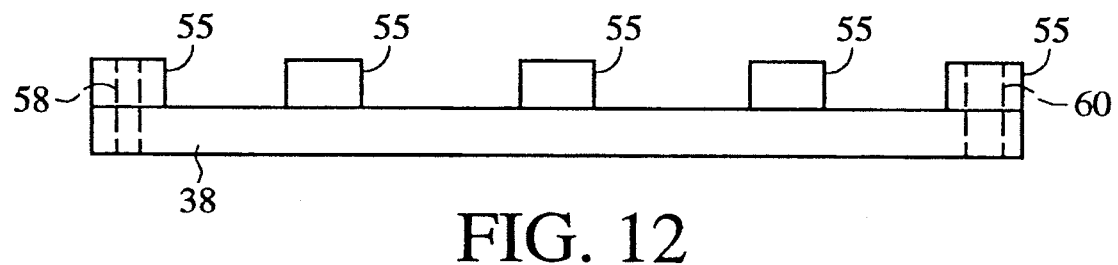
FIG. 12 is a side end view of the cover plate and spacers in FIG. 11.

In FIGS. 11 and 12, a thin silicon wafer substrate 38, typically about 1.25 mm thick, forms a high thermal conductivity cover plate for the reservoir stage of FIG. 13. The cover plate 58 has a set of standoff supports 55, typically about five in number, on one surface of the cover plate 38, which serve as thermal isolators that insulate the reservoir stage from the heat exchanger stage formed by the substrates 32, 34 and 36. The supports 55 are typically cylindrical bumps or rods, about 2.0 mm in diameter which are made of G10 fiberglass or some other thermally insulating material, such as PTFE or epoxy. The axes of two of the corner supports 55 have holes 58 and 60 drilled therein and through the silicon substrate 38, which are aligned with and match the dimensions of the corresponding holes 57 and 56 in the substrate 36 of FIG. 9. The holes 58 and 60 allow the flow of the primary coolant gas between the reservoir and heat exchanger stages of the device while maintaining the thermal isolation of those two stages. The cover plate 38 is seen to have a shape that essentially describes a square with approximately 1.75 cm edges, but with two opposing corners having extensions that reach the corresponding corners of the approximately 2.5 cm square substrate 36 of FIG. 9. The extensions allow the standoff supports 55 with holes 58 and 60 to line up with the corresponding holes 57 and 56 in the substrate 36.

Figures 14, 15:
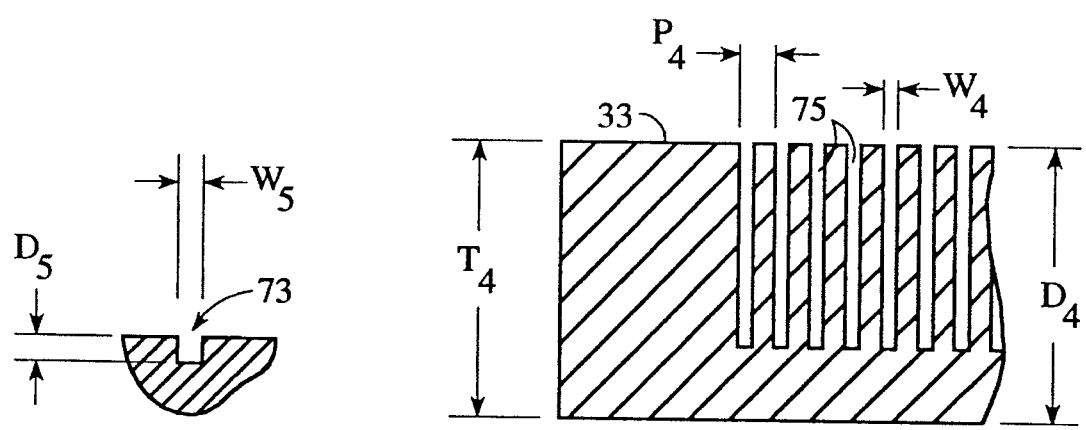
FIGS. 14 and 15 are sectional views taken along the lines 14—14 and 15—15, respectively, in FIG. 13, respectively illustrating the flow restricting passageway or Joule-Thomson expansion valve of the two-stage cryostat and the primary coolant reservoir channels of the cryostat.

With reference to FIGS. 13–15, the reservoir stage is formed by a thin, flat monocrystalline silicon wafer substrate 33 about 1.8 to 2.0 mm thick ($T_4$) with a set of parallel channels 75 formed in one of its major surfaces at a pitch ($P_4$) of about every 250 μm. The substrate 33 has the same shape and dimensions as the cover plate 38, with the extensions of substrate 33 provided with holes 59 and 62 therethrough and a pair of channels 73 and 79 forming passageways connecting the holes 59 and 62 with the set of about 60 parallel channels 75. One of the passageways 73, connected to the inlet hole 73 receiving high pressure primary coolant gas from the second layer 34 of the heat exchanger stage, has a substantially smaller cross-sectional area than any of the other channels. In particular, it has a smaller cross-section than that of the parallel passageways 75, and forms a flow restricting passageway 73 that provides the Joule-Thomson throttle valve for the primary coolant. As seen in FIG. 14, the restricting passageway 73 has a width $W_5$ that is approximately 65 to 115 μm, or nearly the same as width $W_4$ of the parallel channels 75 seen in FIG. 15, but has a substantially shallower depth $D_5$ of approximately 65 to 115 μm, compared to the depth $D_4$ of approximately 1.2 to 1.6 mm for the parallel channels 75. The restricting passageway 73 chokes the flow, separating the high pressure inlet 59 from the low pressure parallel passages 75, and allowing an over thousand-fold expansion in flow area as the primary coolant opens into the passages 75. The restricting passageway 73 could have a tapered width $W_5$, if desired, or more typically a substantially uniform width. While the tapered width would provide a coolant expansion which is more closely isenthalpic, it is also more difficult to fabricate. While a restricting passageway 73 with uniform width and depth does not result in a purely isenthalpic expansion, so that there is some parasitic heat leakage due to the isenthalpic component, the reduction in efficiency is tolerable in most cases. The length of the restricting passageway 73, typically about 5.4 mm, determines the primary coolant flow rate in the system, with a shorter choke allowing greater flow.

Returning to FIGS. 1 and 2, and especially FIG. 2, the several layers of the cryostat device are stacked as shown then pressure bonded to each other, with the flat nonchannel surface of each substrate forming a fluid-sealed cover for the channeled surface of the adjacent substrate. A silicon base 30 forms the cover plate for the channels in the first heat exchanger layer 32. The insulative standoff supports may be bonded to the nonchannel side of the third heat exchanger layer 36 with an epoxy adhesive. The infrared detection array 13 or some other object to be cryogenically cooled is mounted on the flat nonchannel surface of the substrate 33.

Figure 16:
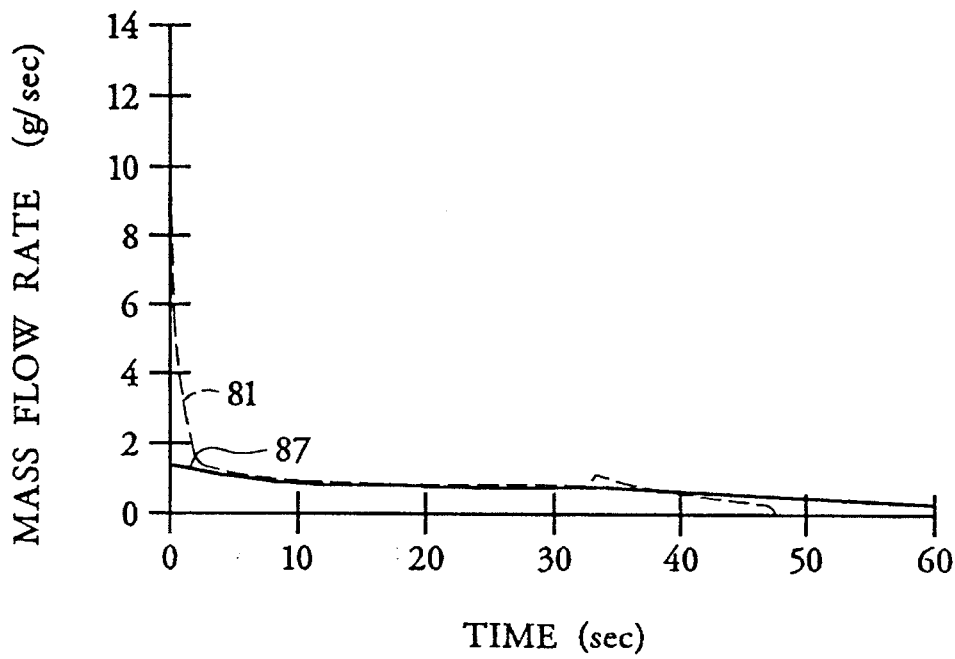
FIGS. 16 and 17 are graphs of mass flow rate and supply pressure versus time for primary (solid curves) and secondary (dashed curves) coolant gases in a cryostat corresponding to the first two-stage embodiment of the present invention illustrated in FIGS. 1–15.
Figure 17:
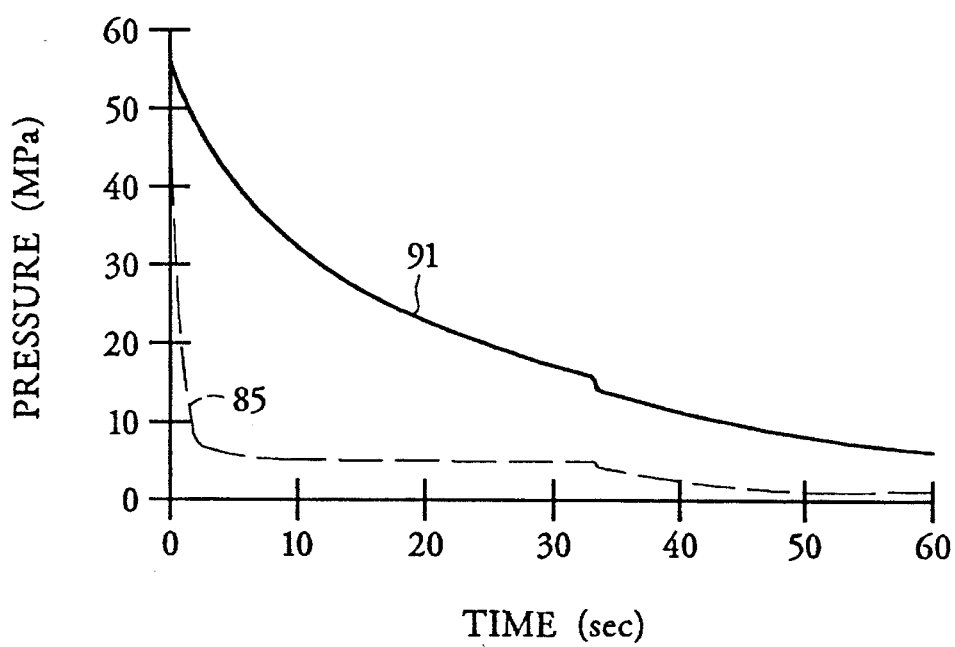
Figure 18:
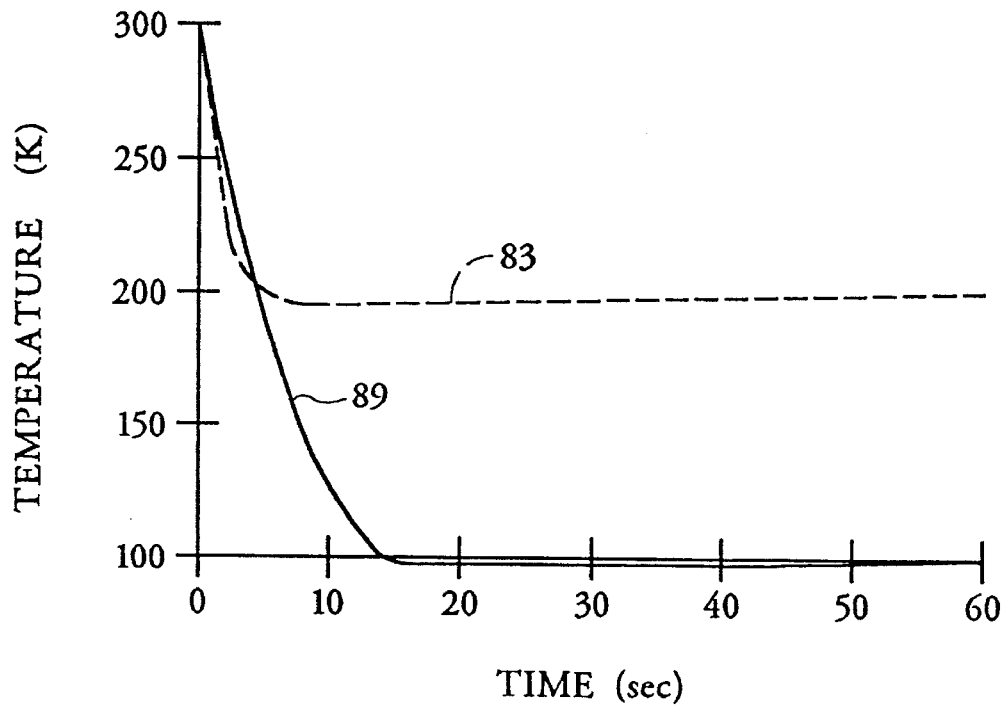
FIG. 18 is a graph of temperature versus time for a first heat exchanger stage (dashed curve) and a second primary coolant reservoir stage (solid curve) of a cryostat corresponding to the first two-stage embodiment of the present invention for mass flow rates and supply pressures in accord with FIGS. 16 and 17.

Referring to FIGS. 16–18, typical mass flow rates and supply pressures for the primary and secondary coolant gases and typical first and second stage temperatures are shown versus time for one-time operation of a two-stage cryostat of the present invention. These values simulate the results of using a 75 cc tank of argon as the primary coolant supply and a 50 cc tank of R23 as the secondary coolant supply. A large mass flow rate of R23, shown as dashed curve 81 in FIG. 16, is used in the first few seconds of operation to quickly bring the first stage down to a spatially uniform temperature of about 200 K., as seen by the dashed curve 83 in FIG. 18. The secondary coolant supply pressure, shown as dashed curve 85 in FIG. 17, quickly drops to about 5 MPa as a result. After the initial first stage precooling period, the secondary coolant flow rate remains generally steady, declining only gradually over the next 30 to 40 seconds until the supply of R23 runs out. The secondary coolant flow rate during this steady period is approximately equal to the primary coolant flow rate, shown as the solid curve 87 in FIG. 16, which also declines gradually from about 2 gm/sec initially to about 1 gm/sec after about 20 seconds and to about 0.2 gm/sec after 60 seconds. The primary coolant flow rate is chosen to provide the needed refrigeration capacity to cool the detector array to its 100 K. operating temperature in about 15 seconds, as seen by the solid curve 89 in FIG. 18, representing the temperature on the top surface of the second stage. The slower flow rate for the primary coolant causes its supply pressure to drop only gradually, as seen by the solid curve 91 in FIG. 17. The primary coolant supply pressure remains above 20 MPa for at least 20 seconds so as to provide efficient refrigeration under J-T expansion.

Figure 19:
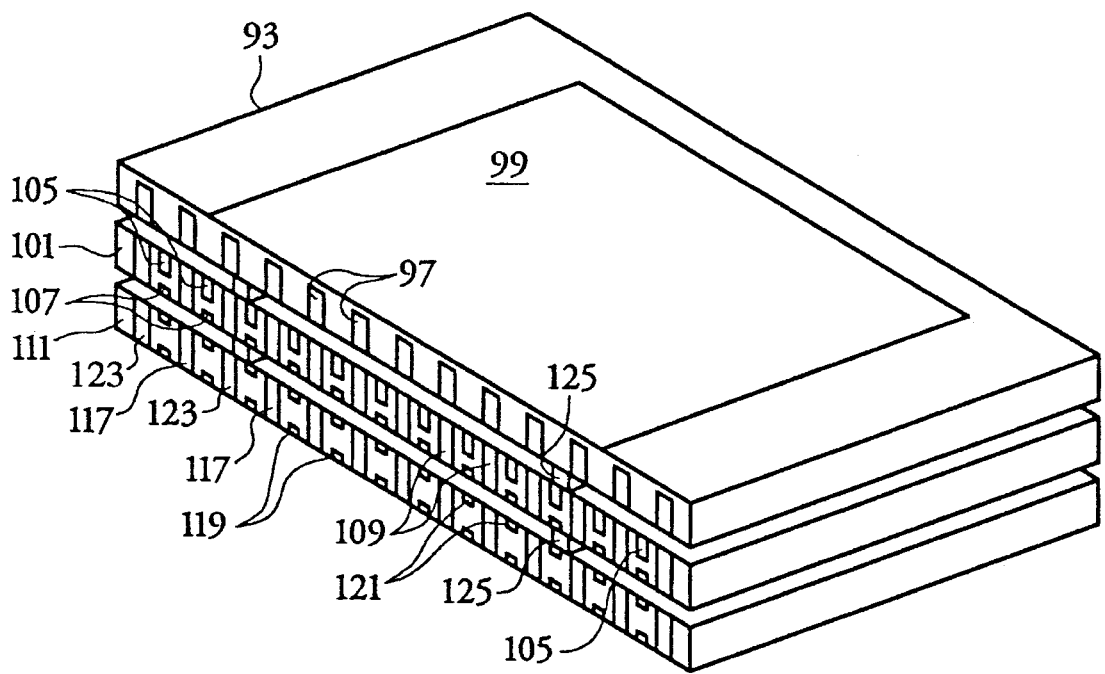
FIG. 19 is a refrigeration flow schematic for a three-stage Joule-Thomson cryostat in accord with the present invention.
Figure 20:
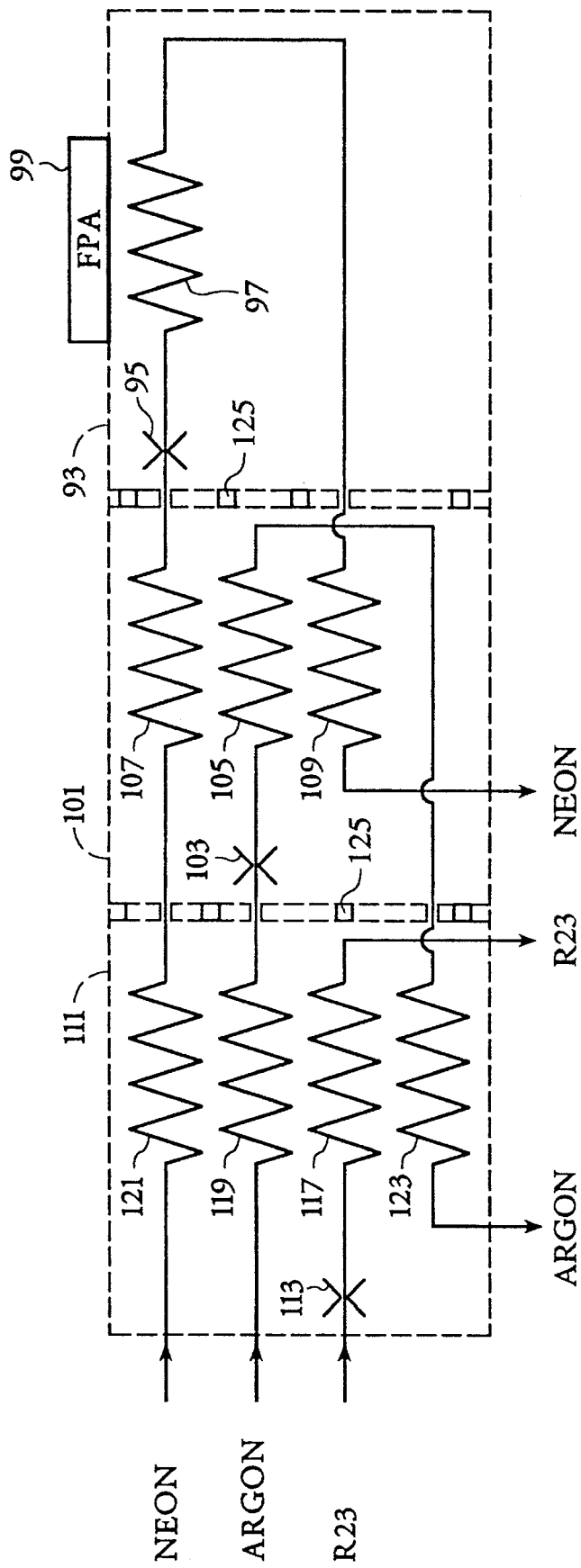
FIG. 20 is a cutaway perspective view of an embodiment of a three-stage cryostat corresponding to the flow schematic of FIG. 19, with the cutaway portion revealing representative gas flow passages in each stage.

With reference to FIGS. 19 and 20, a three-stage embodiment of the present invention uses cascade cooling to reach temperatures of 20–40 K. is feasible. In this embodiment, the primary coolant is a lower boiling temperature gas, represented here by neon. Hydrogen gas might also be used. A higher boiling temperature gas, represented here by argon, is used to bring the primary coolant below its inversion temperature so that cooling will take place when the primary gas undergoes J-T expansion. As in the first embodiment, an auxiliary gas, such as R23, is used to precool the argon so that it too is capable of producing J-T cooling. In the third stage 93, precooled high pressure neon gas passes through a restricting passageway forming a throttle valve 95 for causing isenthalpic volume expansion of the neon. The passageway 95 opens into a two-phase reservoir, consisting of many parallel passages 97 in heat exchange relation with an object 99 to be cooled, such as a long-wavelength infrared detector or a superconducting sensor device. In the second stage 101, a throttle valve passageway 103 opens into parallel two-phase argon reservoir passages 105, providing low-pressure liquified argon for precooling the high pressure neon gas in heat exchange relation with the argon in adjacent passages 107. The low pressure neon gas returning from the third stage 93 is also in counterflow heat exchange relation with the high pressure neon supply 107 in a third set of passages 109. For ease in forming the plumbing for the first stage 111, the low pressure neon in second stage passages 109 is typically exhausted directly to ambient from the second stage 101. However, the neon return gas could also pass through the first stage 111, if desired. In the first stage 111, a high pressure supply of auxiliary coolant gas with an above-ambient inversion temperature passes through a throttle valve passageway 113 into low-pressure, two-phase reservoir passages 117. The low-pressure argon returning from the second stage 101 may have its own separate heat exchange passages 123. Alternatively, the returning low-pressure argon vapor can be mixed with the expanded auxiliary coolant in a single passage. The passages 117 and 123 are in heat exchange relation with both high-pressure argon and neon supply passages 119 and 121 to precool these gases to about 200 K. Each of the stages 111, 101 and 93 is at a spatially uniform temperature and is thermally isolated via insulating point-contact supports 125. The stages are constructed of thermally conductive planar material, such as silicon wafers, with etched surface channels forming the passages in combination with bonded cover plates covering the channels in a pressure tight manner. The stages are stacked over one another for compactness.

One effect of the precooling provided by the first one or two stages is that the temperature drop required in the J-T expansion step is significantly reduced. Since the temperature drop during isenthalpic expansion is approximately proportional to the pressure drop, the pressure provided in the compressed gas supply need not be as great. The high pressure coolant gas sources will typically supply sustained pressures of not more than about 20 MPa.

We claim:

1. A stacked multistage Joule-Thomson cryostat, comprising:

a plurality of supplies of different highly pressurized gas coolants with different boiling temperatures at ambient pressure, said supplies of coolants including a primary coolant with a lowest boiling temperature and at least one secondary coolant with an inversion temperature that is above ambient temperature, a plurality of stages stacked one above the other in thermal isolation from each other, each stage including a thermally conductive material plate member with fluid passages formed therein, the fluid passages in each stage including two-phase reservoir passages associated with a different coolant from reservoir passages in the other stages and a restricting passageway in fluid communication with the high pressure gas supply of that associated coolant, said restricting passageway forming a Joule-Thomson throttle valve opening into said reservoir passages for isenthalpic expansion and liquefaction of the associated coolant, said reservoir passages of a coldest stage associated with said primary coolant being in heat exchange relation with a cold surface of that coldest stage, said cold surface adapted for mounting a device to be cooled thereto in thermal contact therewith, each stage other than said coldest stage also having high pressure coolant supply passages in heat exchange relation with said reservoir passages of that stage for precooling each gas coolant with a lower boiling temperature than the coolant associated with that stage.

2. The cryostat of claim 1 wherein said plate member of each stage comprises at least one thin, generally planar, wafer substrate of thermally conductive material with said fluid passages comprising channels formed in at least one surface of said wafer substrate, and at least one cover plate bonded in pressure-tight sealed contact with said at least one surface of said wafer substrate.

3. The cryostat of claim 2 wherein said thermally conductive material comprises silicon.

4. The cryostat of claim 2 wherein said channels are photolithographically etched into said surface of said wafer substrate.

5. The cryostat of claim 2 wherein said flow restricting passageways forming said throttle valves of each stage comprise channels of smaller cross-sectional area than the reservoir passageways of that stage.

6. The cryostat of claim 2 wherein thermally insulating standoff supports separate said stages.

7. The cryostat of claim 1 wherein said gas coolants are selected from the group consisting of hydrogen, neon, nitrogen, argon, krypton, ethane, $CHF_3$, $CF_4$ and ammonia.

8. A stacked two-stage Joule-Thomson cryostat, comprising:

a supply of high pressure, primary coolant gas, a supply of high pressure, secondary coolant gas, said secondary coolant gas characterized by an inversion temperature that is above ambient temperature and by a boiling temperature at ambient pressure that is less than an inversion temperature of said primary coolant gas, a first stage including a thermally conductive material plate member with fluid passages formed therein, said fluid passages including a high pressure primary coolant supply path with an inlet connected to said supply of high pressure primary coolant gas and with an outlet, a low pressure primary coolant return path with an inlet and an outlet, and a secondary coolant path with an inlet connected to said supply of high pressure secondary coolant gas and with an outlet, said secondary coolant path including a flow restricting passageway forming a throttle valve opening into a secondary coolant reservoir in heat exchange relation with said high pressure primary coolant supply path, and a second stage, thermally isolated from said first stage and stacked above said first stage, including a thermally conductive material plate member with fluid passages formed there, said fluid passages including a primary coolant path with an inlet connected to said outlet of said high pressure primary coolant supply path of said first stage and with an outlet connected to said inlet of said low pressure primary coolant return path of said first stage, said primary coolant path in said second stage including a flow restricting passageway forming a throttle valve for said primary coolant gas opening into a primary coolant reservoir in heat exchange relation with a cold surface of said second stage, said cold surface adapted for mounting a device to be cooled thereto in thermal contact with said cold surface.

9. The cryostat of claim 8 wherein said primary coolant reservoir comprises a plurality of parallel flow passages substantially co-extensive with said cold surface and connected between said flow restricting passageway for said primary coolant and said outlet of said primary coolant path in said second stage.

10. The cryostat of claim 8 wherein said secondary coolant reservoir comprises a plurality of parallel flow passages in thermal communication with said high pressure primary coolant supply path and connected between said flow restricting passageway for said secondary coolant and said outlet of said secondary coolant path in said first stage.

11. The cryostat of claim 10 wherein said plurality of parallel flow passages are common to both said secondary coolant path and said low pressure primary coolant return path, said parallel flow passages also being connected between said inlet of said low pressure primary coolant return path and said outlet of said low pressure primary coolant return path, said low pressure primary coolant return path and said secondary coolant path having a common outlet.

12. The cryostat of claim 8 wherein each plate member of said first and second stages comprises at least one thin, generally planar, wafer substrate of thermally conductive material, said fluid passages formed in said plate members comprising channels formed in at least one surface of said wafer substrate of each stage, each plate member also comprising at least one cover plate bonded in pressure-tight sealed contact with said at least one interface of said wafer substrate.

13. The cryostat of claim 12 wherein said thermally conductive material comprises silicon.

14. The cryostat of claim 12 wherein said channels are photolithographically etched into said surface of said wafer substrate.

15. The cryostat of claim 8 wherein each said flow restricting passageway comprises a channel of smaller cross-sectional area than the passages of said coolant reservoir into which said flow restricting passageway opens.

16. The cryostat of claim 8 wherein thermally insulating standoff supports separate said first and second stages.

17. The cryostat of claim 8 wherein said primary coolant gas is selected from the group consisting of argon and nitrogen.

18. The cryostat of claim 8 wherein said secondary coolant gas is selected from $CHF_3$, ethane and krypton.

19. A stacked three-stage Joule-Thomson cryostat, comprising:

a supply of high pressure, primary coolant gas, a supply of high pressure, secondary coolant gas, said secondary coolant gas characterized by a boiling temperature at ambient pressure that is less than an inversion temperature of said primary coolant gas, a supply of high pressure, auxiliary coolant gas, said auxiliary coolant gas characterized by an inversion temperature that is above ambient temperature and by a boiling temperature at ambient pressure that is less than an inversion temperature of said secondary coolant gas, a first stage including a thermally conductive plate member with fluid passages formed therein, said fluid passages including a first high pressure primary coolant supply path with an inlet connected to said supply of high pressure primary coolant gas and with an outlet, a high-pressure secondary coolant supply path with an inlet connected to said supply of high pressure secondary coolant gas and with an outlet, a low pressure secondary coolant return path with an inlet and an outlet, and an auxiliary coolant path with an inlet connected to said supply of high pressure auxiliary coolant gas and with an outlet, said auxiliary coolant path including a flow restricting passageway forming a throttle valve for said auxiliary coolant gas opening into an auxiliary coolant reservoir in heat exchange relation with said high pressure, primary and secondary, coolant supply paths, a second stage, thermally isolated from said first stage and stacked above said first stage, including a thermally conductive material plate member with fluid passages formed therein, said fluid passages including a second high pressure primary coolant supply path with an inlet connected to said outlet of said first high pressure primary coolant supply path of said firs stage and with an outlet, a secondary coolant path with an inlet connected to said outlet of said high pressure secondary coolant supply path of said first stage and with an outlet connected to said inlet, said low pressure secondary coolant return path of said first stage, and a low pressure primary coolant return path with an inlet and an outlet, said secondary coolant path in said second stage including a flow restricting passageway forming a throttle valve for said secondary coolant gas opening into a secondary coolant reservoir in heat exchange relation with said second high pressure primary coolant supply path of said second stage, and a third stage, thermally isolated from said second stage and stacked above said second stage, including a thermally conductive material plate member with fluid passages formed therein, said fluid passages including a primary coolant path with an inlet connected to said outlet of said second high pressure primary coolant supply path of said second stage and with an outlet connected to said inlet of said low pressure primary coolant return path of said second stage, said primary coolant path in said third stage including a flow restricting passageway forming a throttle valve for said primary coolant gas opening into a primary coolant reservoir in heat exchange relation with a cold surface of said third stage, said cold surface adapted for mounting a device to be cooled thereto in thermal contact with said cold surface.

20. The cryostat of claim 19 wherein each of said primary, secondary and auxiliary coolant reservoirs comprises a plurality of parallel flow passages in said respective first, second and third stages.

21. The cryostat of claim 19 wherein each plate member of said first, second and third stages comprises at least one thin, generally planar, wafer substrate of thermally conductive material, said fluid passages formed in said respective plate members comprising channels formed in at least one surface of said wafer substrate of each stage, each plate member also comprising at least one cover plate bonded in pressure-tight sealed contact with said at least one surface of said wafer substrate.

22. The cryostat of claim 21 wherein said thermally conductive material comprises silicon.

23. The cryostat of claim 21 wherein said channels are photolithographically etched into said surface of said wafer substrate.

24. The cryostat of claim 19 wherein said flow restricting passageway of each stage comprises a channel of smaller cross-sectional area than flow passages of said coolant reservoir into which said flow restricting passageway opens.

25. The cryostat of claim 19 wherein thermally insulating standoff supports separate said first, second and third stages.

26. The cryostat of claim 19 wherein said primary coolant gas is selected from the group consisting of neon and hydrogen.

27. The cryostat of claim 19 wherein said secondary coolant gas is selected from the group consisting of argon and nitrogen.

28. The cryostat of claim 19 wherein said auxiliary coolant gas is selected from the group consisting of $CHF_3$, ethane and krypton.

* * * * *